United States Patent
Christensen et al.

(10) Patent No.: US 9,048,505 B2
(45) Date of Patent: Jun. 2, 2015

(54) LITHIUM-ION BATTERY WITH LIFE EXTENSION ADDITIVE

(71) Applicant: Robert Bosch GmbH, Stuttgart (DE)

(72) Inventors: John F. Christensen, Mountain View, CA (US); Nalin Chaturvedi, Sunnyvale, CA (US); Boris Kozinsky, Waban, MA (US); Paul Albertus, Mountain View, CA (US); Jasim Ahmed, Mountain View, CA (US); Aleksandar Kojic, Sunnyvale, CA (US); Timm Lohmann, Mountain View, CA (US); Roel S. Sanchez-Carrera, Sommerville, MA (US)

(73) Assignee: Robert Bosch GmbH, Stuttgart (DE)

( * ) Notice: Subject to any disclaimer, the term of this patent is extended or adjusted under 35 U.S.C. 154(b) by 187 days.

(21) Appl. No.: 13/667,622

(22) Filed: Nov. 2, 2012

(65) Prior Publication Data

US 2013/0115485 A1    May 9, 2013

Related U.S. Application Data

(60) Provisional application No. 61/555,357, filed on Nov. 3, 2011.

(51) Int. Cl.
*H01M 2/00* (2006.01)
*H01M 4/02* (2006.01)
(Continued)

(52) U.S. Cl.
CPC .............. *H01M 10/052* (2013.01); *H01M 4/02* (2013.01); *H01M 2/00* (2013.01); *H01M 14/00* (2013.01);
(Continued)

(58) Field of Classification Search
CPC ....... H01M 2/00; H01M 4/02; H01M 10/484; H01M 10/486; H01M 14/00
USPC ............... 429/50, 61, 62, 142, 215, 214, 209
See application file for complete search history.

(56) References Cited

U.S. PATENT DOCUMENTS 4,756,844 A    7/1988   Walles et al.
5,824,434 A *  10/1998  Kawakami et al. ........... 429/209
(Continued)

FOREIGN PATENT DOCUMENTS

WO    2006050100 A2    5/2006
WO    2008002626 A2    1/2008

OTHER PUBLICATIONS

Ji et al., "Stabilizing lithium—sulphur cathodes using polysulphide reservoirs," Nature Communications; May 24, 2011; pp. 1-7; Macmillan Publishers Limited; Canada (7 pages).
International Search Report and Written Opinion in corresponding PCT application (i.e., PCT/US2012/063353), completed Feb. 8, 2013 (11 pages).

*Primary Examiner* — Kenneth Douyette
(74) *Attorney, Agent, or Firm* — Maginot Moore & Beck LLP

(57) ABSTRACT

A system and/or method for replenishing lithium-ion battery capacity that is lost due to side reactions over the lifetime of a battery in one embodiment includes a battery with a first electrode, a second electrode, a separator region configured to electronically isolate the first and second electrodes, a first portion of lithium metal encapsulated within a first ionically insulating barrier configured to prevent transport of lithium ions therethrough, a memory in which command instructions are stored, and a processor configured to execute the command instructions to (i) determine a first lithium content of the first electrode, (ii) compare the first lithium content of the first electrode to a first threshold, and (iii) activate the first portion of lithium metal based on the comparison of the first lithium content to the first threshold.

13 Claims, 7 Drawing Sheets

(51) Int. Cl.
*H01M 10/052* (2010.01)
*H01M 14/00* (2006.01)
*H01M 4/38* (2006.01)
*H01M 10/48* (2006.01)

(52) U.S. Cl.
CPC ............ *H01M 4/382* (2013.01); *H01M 10/484* (2013.01); *H01M 10/486* (2013.01); *Y02E 60/122* (2013.01); *Y02T 10/7011* (2013.01)

(56) References Cited

U.S. PATENT DOCUMENTS

| | | |
|---|---|---|
| 6,864,018 B2 | 3/2005 | Huang et al. |
| 7,592,095 B2 | 9/2009 | Lee et al. |
| 7,816,042 B2 | 10/2010 | Huang |
| 2004/0121486 A1 | 6/2004 | Uhland et al. |
| 2006/0093871 A1 | 5/2006 | Howard et al. |
| 2008/0003490 A1* | 1/2008 | Christensen et al. ........... 429/61 |

* cited by examiner

Main Reactions:

$Li^+ + e^- + N \rightarrow LiN \quad LiP \rightarrow Li^+ + e^- + P$

Main Reactions:

$LiN \rightarrow Li^+ + e^- + N \quad Li^+ + e^- + P \rightarrow LiP$

Main Reactions:

$Li^+ + e^- + N \rightarrow LiN \quad LiP \rightarrow Li^+ + e^- + P$

Side Reaction: $S + e^- \rightarrow S^-$

Main Reactions:

$LiN \rightarrow Li^+ + e^- + N \quad Li^+ + e^- + P \rightarrow LiP$

LITHIUM-ION BATTERY WITH LIFE EXTENSION ADDITIVE

This application claims the benefit of U.S. Provisional Application No. 61/555,357, filed Nov. 3, 2011, the entire contents of which are incorporated herein by reference.

FIELD OF THE INVENTION

The present disclosure relates to batteries and more particularly to lithium-ion batteries.

BACKGROUND

Rechargeable lithium-ion batteries are attractive energy storage systems for portable electronics and hybrid-electric vehicles because of their high energy density and rate capability. However, they generally suffer degradation mechanisms that limit their useful life. These degradation mechanisms can be classified as power fade (an increase in internal resistance of the battery) and capacity fade (a decrease in useable capacity). Capacity fade, in turn, can be divided into (i) degradation or loss of the active material that serves as a host to the lithium ions in the two working electrodes and (ii) loss of charge due to side reactions at one or both of the electrodes. Christensen, J. and J. Newman, "Effect of Anode Film Resistance on the Charge/Discharge Capacity of a Lithium-ion Battery", *Journal of the Electrochemical Society*, 150 (2003) A1416; Christensen, J. and J. Newman, "Cyclable Lithium and Capacity Loss in Li-Ion Cells", *Journal of the Electrochemical Society*, 152 (2005) A818.

A typical Li-ion cell 10, as shown in FIG. 1, contains a negative electrode 20, a positive electrode 22, and a separator region 24 between the negative and positive electrodes 20/22. Both electrodes 20/22 contain active materials 26 and 28, respectively, into which lithium can be inserted, inert materials 36, and a current collector 38/40, respectively. The active materials 26/28 are also referred to as lithium-insertion materials. The separator 24 contains an electrolyte with a lithium cation, and serves as a physical barrier between the electrodes 20/22 such that the electrodes 20/22 are not electronically connected within the cell 10.

Typically, during charging, there is generation of electrons at the positive electrode 22 and consumption of an equal amount of electrons at the negative electrode 20, and these electrons are transferred via an external circuit 30. In the ideal operation of the cell 10, these electrons are generated at the positive electrode 22 because there is extraction of lithium ions from the active material 28 of the positive electrode 22, and the electrons are consumed at the negative electrode 20 because there is insertion of lithium ions into the active material 26 of the negative electrode 20. During discharging, the exact opposite reactions occur.

The main charge-transfer reactions that occur at the two electrodes 20/22 during charge, which results in Li$^+$ moving in the direction of arrow 32, are:

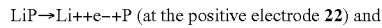

LiP→Li++e−+P (at the positive electrode 22) and

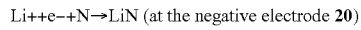

Li++e−+N→LiN (at the negative electrode 20)

wherein P represents the positive electrode material 28 and N the negative electrode material 26. Accordingly, LiP and LiN are the positive electrode materials and negative electrode materials, respectively, intercalated with lithium. For discharging, these reactions proceed in the opposite direction with Li$^+$ moving in the direction of arrow 34.

The charge/discharge cycle for an ideal cell is represented in FIGS. 2A-2E. As shown in the figures, lithium (represented by shading) starts in the positive electrode in the discharged state of the cell (FIG. 2A). During charge (FIG. 2B), lithium is transferred to the negative electrode. At full charge, all of the lithium is transferred to the negative electrode (FIG. 2C). During the subsequent discharge (FIG. 2D), the opposite reactions occur, and all of the lithium is transferred back to the positive electrode at full discharge (FIG. 2E). In the ideal operation of the cell, there are no other charge-transfer reactions, besides the main reactions.

Side reactions have been defined as those charge-transfer reactions that occur other than the insertion or extraction of lithium ions into or out of the active material, with common examples including decomposition of the solvent or formation of the solid electrolyte interphase (SEI) at the negative electrode as reported by Arora, P., R. E. White, and M Doyle, "*Capacity Fade Mechanisms and Side Reactions in Lithium-ion Batteries*", *Journal of the Electrochemical Society*, 145 (1998) 3647, and Aurbach, D., "The Role of Surface Films on Electrodes in Li-ion Batteries", in *Advances in Lithium-Ion Batteries*, W. A. van Schalkwijk and B. Scrosati, Eds. Academic/Plenem Publishers: New York, 2002; p 7. For non-ideal cells, some charge can be consumed via a side reaction. This results in a permanent capacity loss if the side reaction is not fully reversible. In contrast, the main reactions as described above with respect to FIGS. 2A-2E are typically fully reversible.

FIGS. 3A-3E depict an example in which an irreversible side reaction occurs at the negative electrode 20 during charge, consuming electrons that ideally should be consumed by the main reaction. FIG. 3A represents the initial discharged state of the cell. FIG. 3B represents the cell during charge and FIG. 3C represents the cell after the cell is fully charged. FIG. 3D represents the cell during discharge and FIG. 3E represents the cell after the cell is fully discharged. In FIG. 3B, "S" is a generic reactant that could represent the solvent, an anion, or a contaminant. The product S$^−$ may be soluble in the electrolyte, or can form a solid precipitate with the lithium cation. Because this reaction is irreversible in this example, the reverse reaction does not occur during discharge (FIG. 3D), and the charge cannot be transferred back to the positive electrode 22.

The small box 40 below the negative-electrode box 20 thus represents charge that is consumed via the side reaction. It is shaded after the cell is charged to show that some of the charge has been consumed irreversibly (FIG. 3C). However, the total area of the shaded regions in all of the boxes remains constant because charge is conserved. While the example depicted in FIGS. 3A-3E present a completely irreversible reaction, some side reactions may be somewhat reversible, in which case a fraction of the charge consumed by the side reaction can be returned to the positive electrode.

The capacity of the cell is proportional to the number of electrons that are reversibly transferred from one electrode to the other via the external circuit. Thus, as seen from the example in FIGS. 3A-3E, the cell's capacity is reduced because of side reactions.

Some effort has been made to ameliorate the reduced capacity which results from undesired side reactions. U.S. Pat. No. 6,025,093 issued to Herr in 1998, discloses a system wherein cells have been designed to compensate for first-cycle lithium loss during SEI formation. As noted above, SEI is a side reaction.

U.S. Pat. No. 6,335,115, issued to Meissner in 2002 describes the use of an auxiliary lithium electrode that compensates for lithium loss throughout the life of the cell. In the '115 patent, two means of isolating the auxiliary electrode from the working electrodes are disclosed. One such isolation means is ionic isolation and the second isolation means is an electronic isolation. Ionic isolation involves an orientation of the battery in which the lithium-ion containing electrolyte contacts the two working electrodes, but not the auxiliary electrode. The lithium auxiliary electrode is presumably always in electronic contact with one of the working electrodes, but replenishment of lithium to the depleted working electrode does not occur until the cell is reoriented such that the electrolyte is in contact with both the working electrode and the auxiliary electrode.

The ionic isolation approach has some limitations. For example, in a lithium-ion battery the battery would have to be designed such that the electrolyte does not completely fill the pores of the separator and working electrodes. However, the porous separator would naturally act as a wick that transports the electrolyte to the region of the separator that contacts the auxiliary electrode. Even residual electrolyte on the pores of this region of the separator would allow transport of lithium from the auxiliary electrode to the working electrode. Lithium transfer would continue until the potentials of the working and auxiliary electrodes equilibrated. Excessive lithium transfer, beyond the point of capacity balance between the two working electrodes, would result in reduction of the cell's capacity as reported by Christensen, J. and J. Newman, "Effect of Anode Film Resistance on the Charge/Discharge Capacity of a Lithium-ion Battery", *Journal of the Electrochemical Society*, 150 (2003) A1416, and Christensen, J. and J. Newman, "Cyclable Lithium and Capacity Loss in Li-Ion Cells", *Journal of the Electrochemical Society*, 152 (2005) A818.

Moreover, shorting of the auxiliary-electrode-working-electrode circuit via imperfect ionic isolation would lead to rapid transfer of lithium to the working electrode and possible deposition of lithium on the electrode surface. Such lithium deposition can pose a safety risk and/or degrade the cell because the lithium metal reacts rapidly and exothermically with the organic solvent used in the electrolyte as reported by Arora, P., M. Doyle, and R. E. White, "Mathematical Modeling of the Lithium Deposition Overcharge Reaction in Lithium-ion Batteries Using Carbon-based Negative Electrodes", *Journal of the Electrochemical Society*, 146 (1999) 3543.

Even if it were possible to maintain ionic isolation of the auxiliary electrode until lithium transfer is required, the cell design disclosed in the '115 patent would require additional electrode and separator material that is unutilized. Moreover, the orientation of the cell in FIG. 1 of the '115 patent is such that the two working electrodes are not in ionic contact, and therefore, lithium transport between the two electrodes is impossible in this orientation.

Even if the foregoing shortcomings are addressed, a system which relies upon reorientation of the battery significantly reduces the number of potential applications. For example, battery-powered devices such as power tools may be used in any orientation, meaning that the auxiliary-electrode-working-electrode circuit could be closed unintentionally during standard operation of the battery. Hence, the device disclosed in the '115 patent appears to be limited to applications that have a fixed orientation.

Another approach disclosed in U.S. Pat. No. 7,726,975, issued to Christensen et al. in June 2010, involves the use of an auxiliary lithium electrode that can be electronically connected to or isolated from one or more of the working electrodes. The system in the '975 patent circumvents the issues raised above by relying upon electronic, rather than ionic, isolation of the lithium reservoir electrode (LRE) from the working electrodes. The '115 patent also discloses such electronic isolation. However, the lithium auxiliary electrode proposed in the '115 patent is placed "between the positive and negative electrodes." Such placement would reduce the uniformity of current distribution, and therefore the rate capability of the cell, when transferring lithium from one working electrode to the other. The approach in the '975 patent avoids this problem by placing the LRE outside the current path between the two working electrodes.

Approaches that rely upon an auxiliary lithium electrode typically suffer from the problem of large length scales associated with the distance of the auxiliary electrode from the working electrodes. A typical length scale between two working electrodes, which are pressed together on either side of a porous separator, is on the order of 100 microns, while the distance from an auxiliary lithium electrode to the farthest region of each working electrode can be on the order of 1 cm or more, even when the auxiliary lithium electrode is sandwiched between the two working electrodes. This is because the auxiliary electrode may not span the entire separator, as this would block ionic transport from one working electrode to the other. Moreover, dendrites could easily form and short one or more working electrode with the auxiliary electrode in this case.

SUMMARY

A battery management system in one embodiment includes a battery including a first electrode and a second electrode, a separator region configured to electronically isolate the first and second electrodes, and a first portion of lithium metal encapsulated within a first ionically insulating barrier configured to prevent transport of lithium ions therethrough. The battery management system further includes a memory in which command instructions are stored and a processor configured to execute the command instructions to (i) determine a first lithium content of the first electrode, (ii) compare the first lithium content of the first electrode to a first threshold, and (iii) activate the first portion of lithium metal based on the comparison of the first lithium content to the first threshold.

The battery management system implements a method to restore the lost capacity in the battery. The method includes determining a first lithium content of a first electrode of the battery, comparing the first lithium content of the first electrode to a first threshold, and activating transfer of a first portion of lithium metal to the electrode based on the comparison of the first lithium content to the first threshold, the first portion of lithium metal encapsulated within a first ionically insulating barrier configured to prevent transport of lithium ions therethrough until the BMS activates the transfer (i.e., causes the barrier to become transparent to Li ions).

DESCRIPTION

Figure 1:
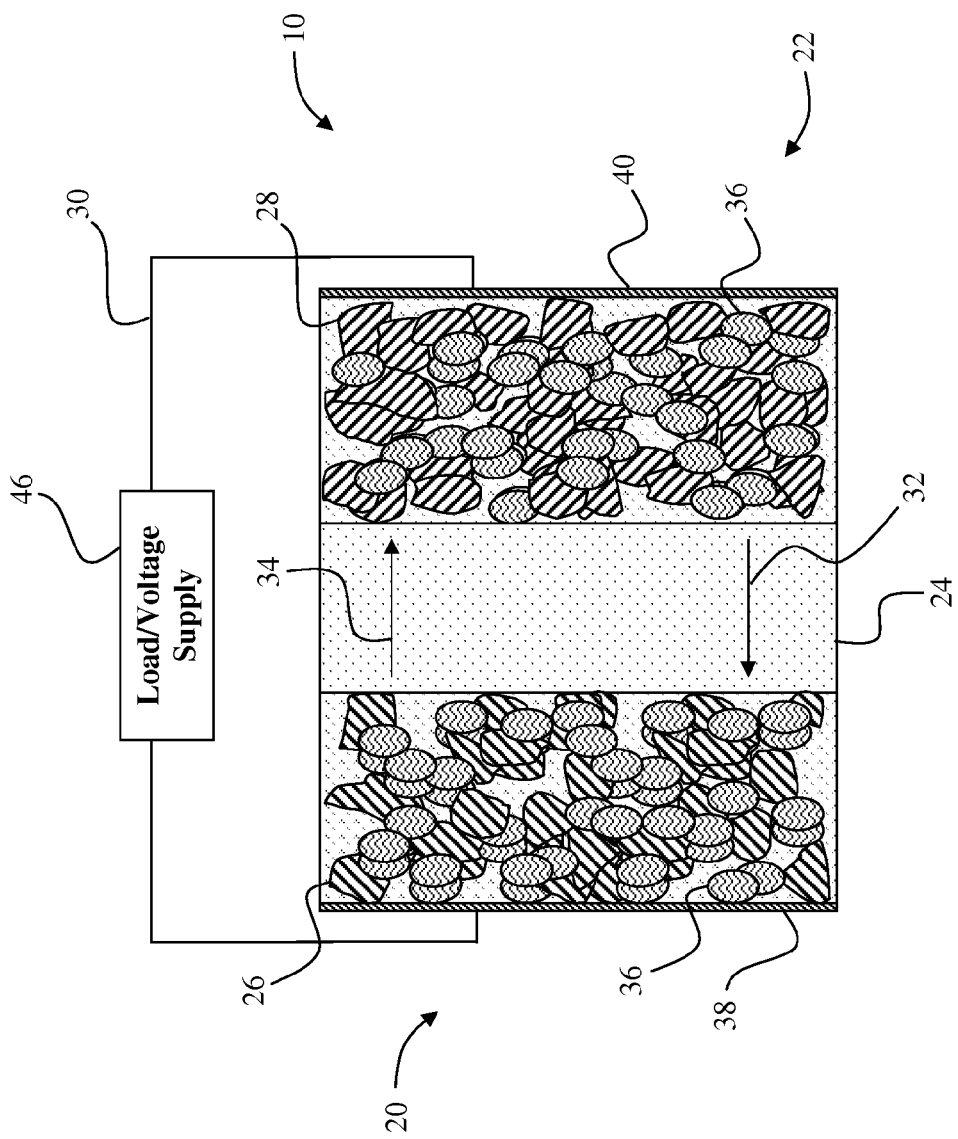
FIG. 1 depicts a typical prior art Li-ion battery.
Figure 2A:
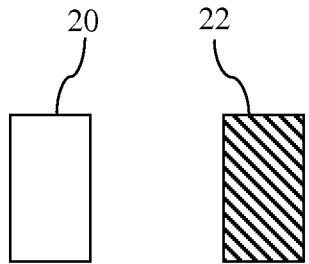
FIGS. 2A-2E depict an ideal charge/discharge cycle of the battery of FIG. 1.
Figure 2B:
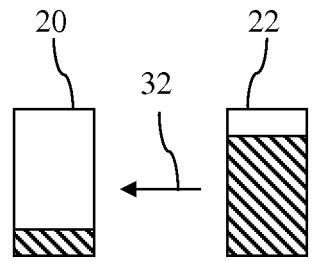
Figure 2C:
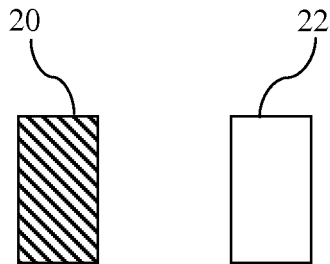
Figure 2D:
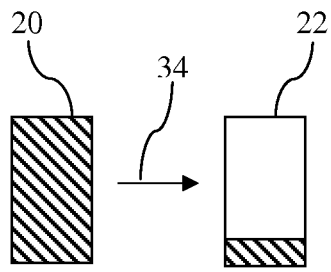
Figure 2E:
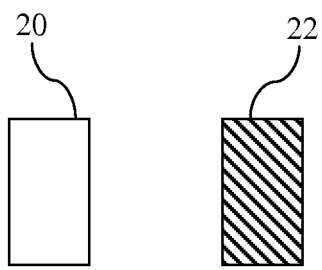
Figure 3A:
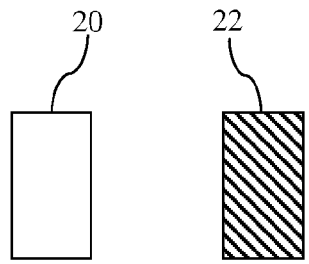
FIGS. 3A-3E depict a charge/discharge cycle of the battery of FIG. 1 with a side reaction.
Figure 3A:
Figure 3B:
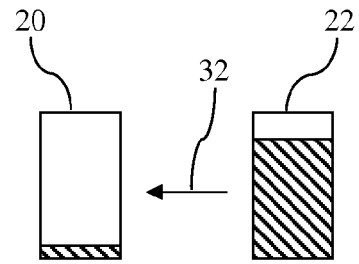
Figure 3B:
Figure 3C:
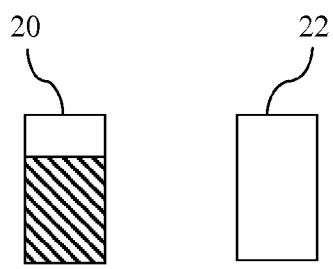
Figure 3C:
Figure 3D:
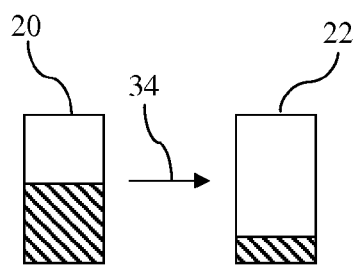
Figure 3D:
Figure 3E:
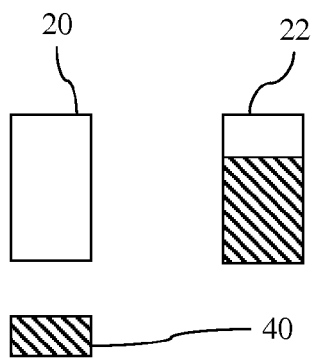

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

Figure 4:
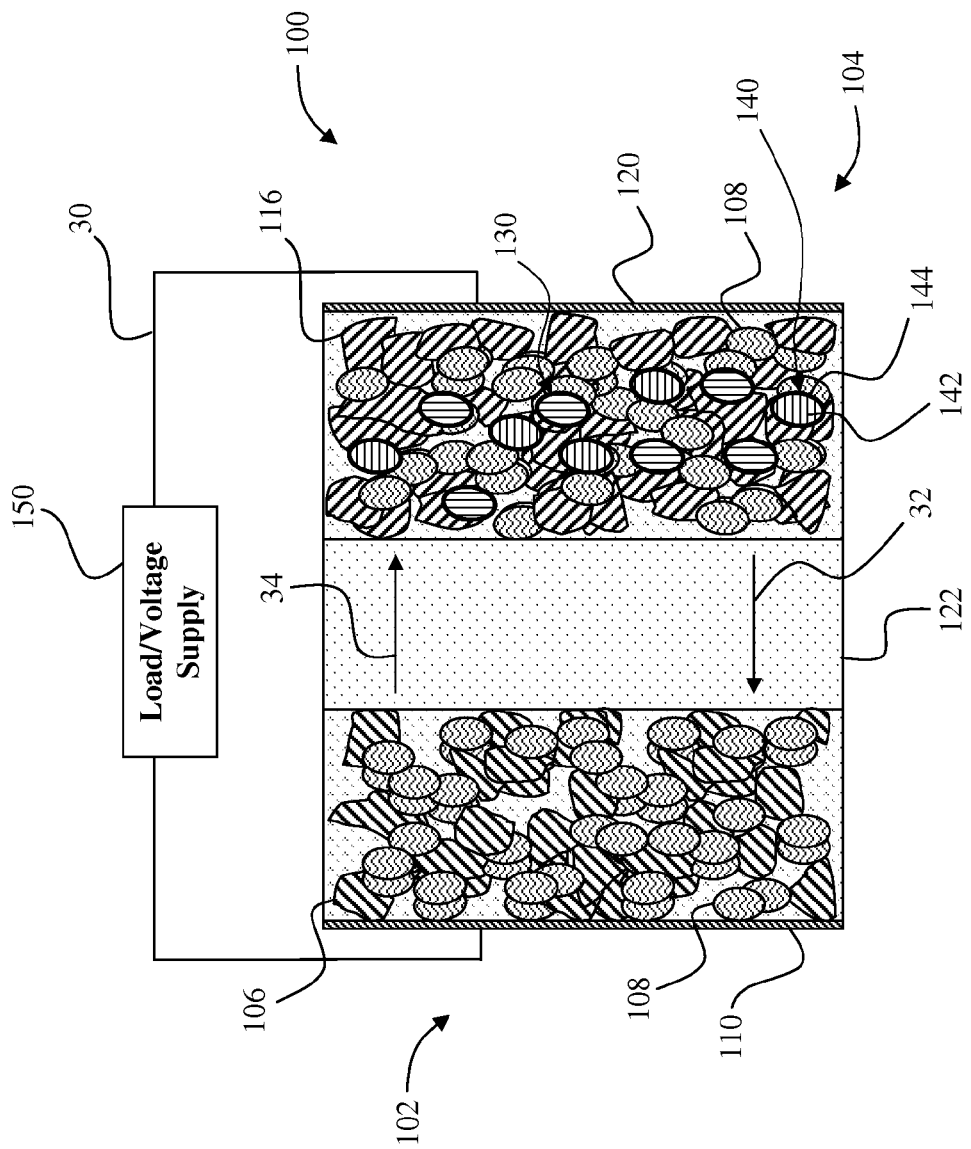
FIG. 4 depicts a Li-ion battery incorporating a selectively activated additive in accordance with the disclosure.

FIG. 4 shows a cell with Li replenishment additives contained in the positive electrode. The cell 100 contains a negative electrode 102 and a positive electrode 104. The negative electrode 102 includes a lithium insertion material 106, inert materials 108, and a current collector 110. The positive electrode 104 includes a lithium insertion material 116, inert materials 108, and a current collector 120. The cell 100 also includes a separator region 122 that contains an electrolyte with a lithium cation, and serves as a physical barrier between the electrodes 102/104 such that the electrodes 102/104 are electronically isolated within the cell 100. The electrolyte enables lithium-ion transfer between the negative and positive electrodes 102/104, which are referred to herein as the working electrodes.

Figure 5:
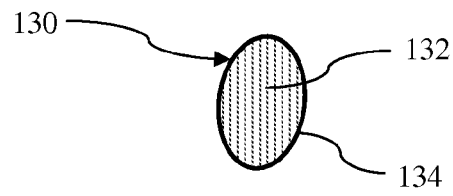
FIG. 5 depicts a cross sectional view of an additive of FIG. 4.

With reference to FIGS. 4 and 5, the cell 100 additionally contains additive 130 which is provided in either or both of the electrodes 102/104 in different embodiments. The additive 130 consists of Li metal particles 132 that are coated with a material 134 that is ionically insulating and, in some embodiments, is electronically conductive. Ionic insulation or barrier 134 prevents transport of Li from the particles 132 to the surrounding composite electrode during normal cell operation. In the embodiment of FIG. 4, a second additive 140 is provided. The additive 140 consists of Li metal particles 142 that are coated with a material 144 that is ionically insulating and, in some embodiments, is electronically conductive.

The two batches of additives 130/140 are independently activated by compromising the insulating material 134/144, such as by breaking, dissolving, or decomposing the insulating material 134/144, or by causing the insulating material 134/144 to be ionically conductive and therefore permeable to Li ions. The activation step in some embodiments involves increasing the temperature of the cell 100 outside the normal operating range, compressing the cell 100 such that enough stress is imparted to the barrier 134 that it fractures, injecting an additive into the electrolyte of the cell 100 that reacts with and decomposes the barrier 134, or changing the potential of the electrode that contains the additive 130 beyond its normal operating range. The insulating material 144 can be independently compromised either by providing an insulating material 144 with a different compromising mechanism, or with a different set point. Thus, at a first temperature the insulating material 134 fractures, while the insulating material 144 does not fracture until a second, higher temperature or cell compression is achieved.

The insulating material 134/144 is preferably at least partially electronically conductive to facilitate transport of electrons from the Li metal core 132/142 to the electronically conductive matrix of the positive electrode 104. Hence, when activated, electrons spontaneously are transferred from the Li metal 132 to the electrode active material 116 through electronically conductive phases, while Li ions are spontaneously transferred to the active material 116 through ionically conductive phases. The transfer is spontaneous because the active insertion materials 116 have a potential higher than that of Li metal 132. While only two insulating materials 134/144 are identified above, several different coatings may be applied to various additives in a particular embodiment. Alternatively, the thickness of the shells may be controlled to provide different compromise set points.

Beneficially, the cell 100 in one embodiment is manufactured in any desired configuration (e.g., spirally wound, prismatically stacked, etc.), and has two terminals, one each for the positive electrode 104 and negative electrode 102.

Figure 6:
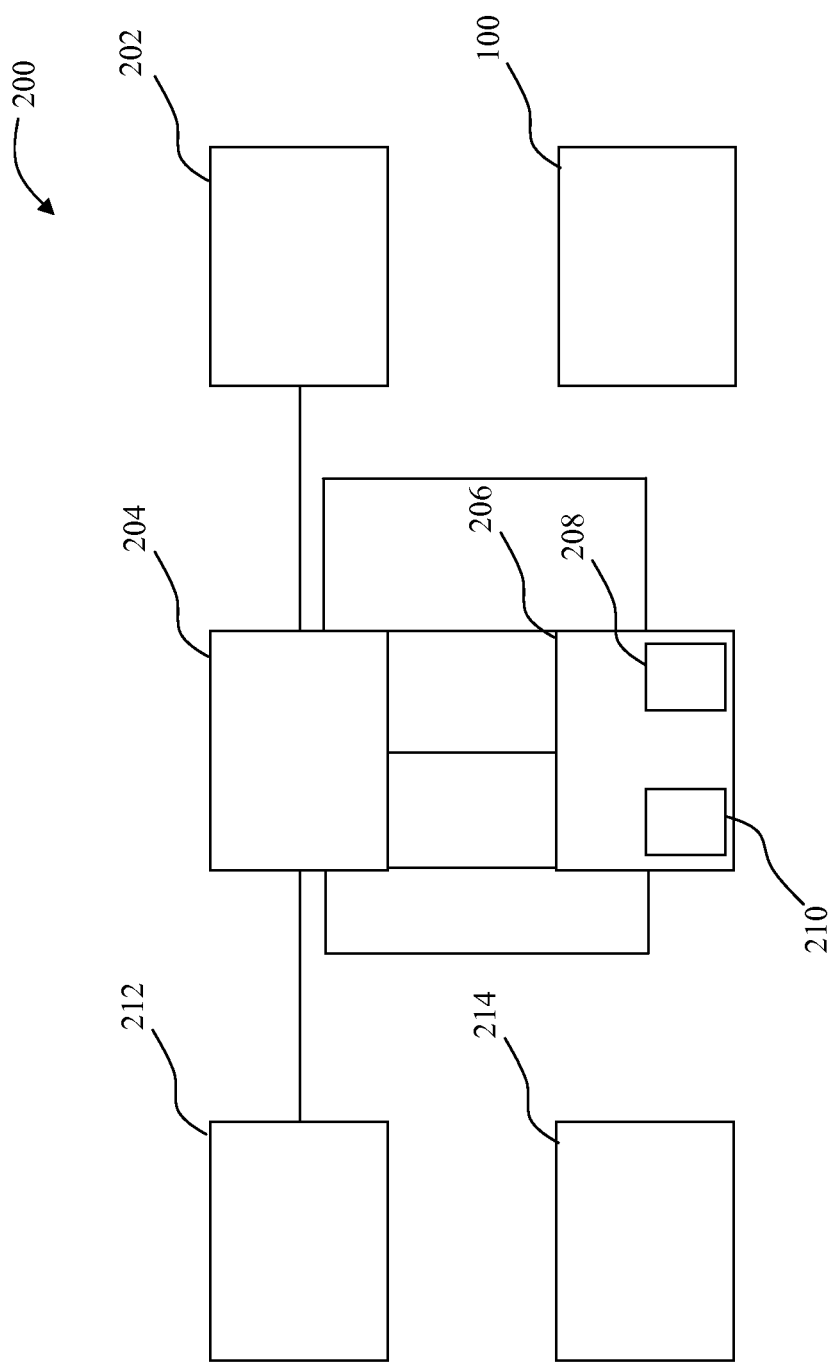
FIG. 6 depicts a battery management system that can be used to control selective activation of the additive of FIG. 5.

In one embodiment, the cell 100 is incorporated into a battery management system 200 which is depicted in FIG. 6. The battery system 200 includes an I/O device 202, a processing circuit 204 and a memory 206. The I/O device 202 in one embodiment includes a user interface, graphical user interface, keyboards, pointing devices, remote and/or local communication links, displays, and other devices that allow externally generated information to be provided to the battery system 200, and that allow internal information of the battery system 200 to be communicated externally. The battery management system 200 in one embodiment is configured to obtain measurements directly from the cell 100 or to obtain data from an intermediate source.

The processing circuit 204 in some embodiments is suitably a general purpose computer processing circuit such as a microprocessor and its associated circuitry. The processing circuit 204 is operable to carry out the operations attributed to it herein.

Within the memory 206 are various program instructions 208. The program instructions 208, some of which are described more fully below, are executable by the processing circuit 204 and/or any other components as appropriate. Insulating material databases 210 are also located within the memory 206. The insulating material databases 210 stores data used to identify the conditions required for compromising the insulating material 134/144 such as a pressure, temperature, additive, etc.

The battery management system 200 further includes compromise control equipment 212 and compromise condition detector suite 214. The compromise control equipment 212 is configured to establish and maintain conditions which result in compromising the insulating material 134/144.

During normal operation, the positive and negative electrode terminals 104/102 are connected to either end of a load 150 during discharge, and to a power supply 150 during charge (FIG. 4). The additives 130/140 remain inactive during normal operation. When the battery system 200 determines it is appropriate to replenish the capacity of the cell 100 lost due to side reactions, the additive, or a single batch of additives 130/140, is activated by establishing conditions which compromise the insulating material 134/144 using the compromise control equipment 212. In one embodiment, the compromise control equipment 212 is equipment used during normal operation of the battery such as a heating element. In another embodiment, the compromise control equipment 212 is used uniquely for establishing compromise conditions, such as a pressure applying device, a heating element, or syringe for adding chemicals to the electrolyte.

Accordingly, a compromising condition is established which in various embodiments includes one or more of increasing the temperature of the cell 100 outside the normal operating range, compressing the cell 100 such that enough stress is imparted to the additives 130/140 that it fractures, injecting an additive into the electrolyte of the cell 100 that reacts with and decomposes the barrier(s) 134/144, or changing the potential of the electrode that contains the additives 130/140 beyond its normal operating range. In one embodiment, the BMS 200 uses the compromise condition detector suite 214 to monitor the precise environment established by the compromise control equipment 212.

Once the additives 130/140 are activated, lithium ions are transferred ionically from the Li metal core(s) 132/142 of the additives 130/140 into the active insertion material 116 that is a constituent of the composite electrode that contains the additive. This transfer in one embodiment is facilitated by simultaneous transport of electrons through the electronically conductive additives 130/140, or electronically conductive portion of the additives 130/140, or by compression of the electrode to establish electronic contact directly between the active insertion material 116 and the Li metal core(s) 132/142 of the additives 130/140. Hence, the cell capacity can be restored to its original value, or close to its original value.

Figure 7A:
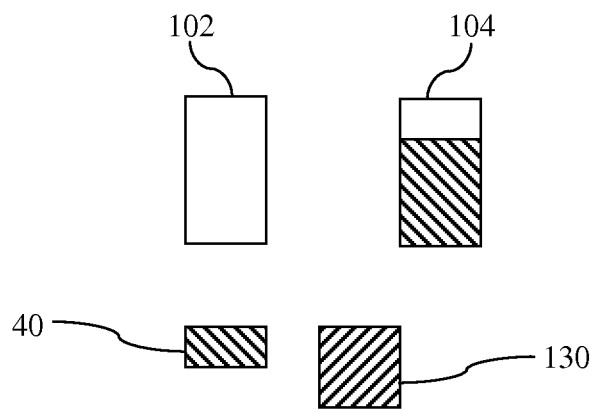
FIGS. 7A-7C depict the effect of the additive of FIG. 4 on the lithium content in the battery of FIG. 4.
Figure 7B:
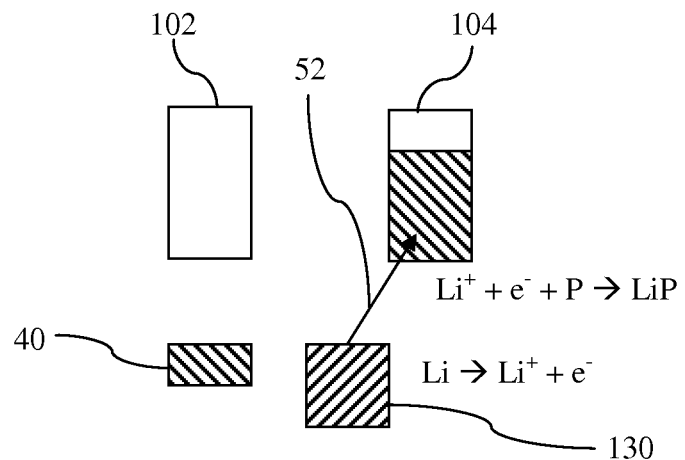
Figure 7C:
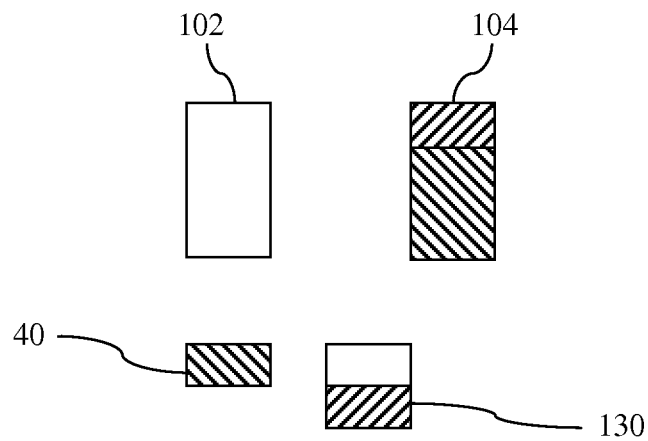

FIGS. 7A-7C illustrate how charge from the additive batch(es), which is contained in the positive electrode, replaces the charge that was lost due to the side reaction illustrated in FIGS. 3A-E. To replace the lost charge of a cell in the discharged state due to the side reaction 40 (FIG. 7A), the additive batch 130 or batches are activated in the positive electrode 104, allowing electrons to flow from the additive 130 to the positive electrode active material in the direction of arrow 52 (FIG. 7B). Simultaneously, lithium dissolves from the additive 130 and is transferred through the electrolyte in the positive electrode 104 to the active material 116, where it is inserted via the main insertion reaction (FIG. 7B). The correct amount of charge to be transferred is determined by the battery management system 200, such that the cell returns to its original capacity, or close to its original capacity (FIG. 7C). This process in one embodiment is repeated several times throughout the life of the cell, depending upon the number of batches of additive available for independent activation.

An inherent challenge in using such an additive is that it is difficult to determine the amount of Li to be transferred to each of the working electrodes. Insertion of too much lithium into the working electrodes can degrade the cell and create a significant safety risk. For example, excess lithiation of one or more working electrode could result in a capacity imbalance between the two electrodes, thereby reducing the capacity of the cell below the value of an optimally balanced cell. Therefore, it is important to know the appropriate time to activate the additive, or additive batch, such that the active insertion material is not overlithiated The present system accounts for this important need to determine the amount of lithium to be transferred by using a battery management system (BMS) 200 for determining the amount of capacity that has been lost from the system due to side reactions. The BMS 200 must therefore estimate the state of charge (SOC) of each working electrode. The SOC of each working electrode corresponds to the amount of lithium contained in it. When the lithium concentration is at its maximum value, the SOC of the electrode is 1, and when it is at its minimum, the SOC is 0. The additive is used to increase the SOC of one or both of the working electrodes through the selective transfer of lithium ions and electrons.

Figure 8:
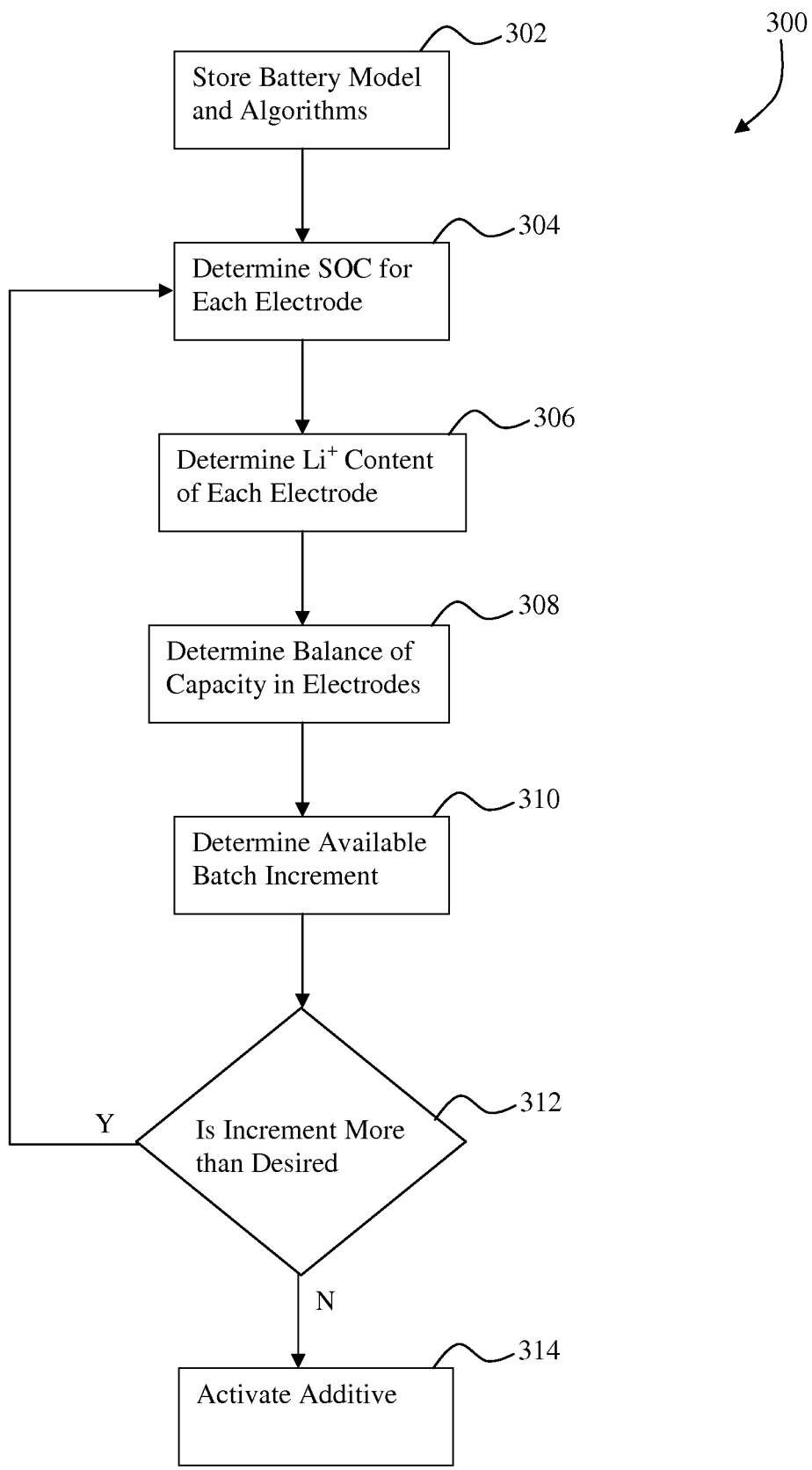
FIG. 8 depicts a procedure that can be executed under the control of the battery management system of FIG. 6 to selectively activate a lithium additive.

With reference to FIG. 8, the processor 204 executes command instructions 208 stored within memory 206 in accordance with a procedure 300 to determine the lost cell capacity and selectively activate the additive 130/140 if certain conditions are met. Initially, criteria for operating the system 200 are stored in the memory 206, at block 302. The criteria may be stored in the form of a battery model and a diagnostic algorithm with different additive activation profiles provided for different factors.

In some embodiments, multiple algorithms are associated with the cell depending on the desired complexity of the system. By way of example, the criteria in some of these embodiments include, among other criteria, a nominal charge voltage ("$V_c$") and a nominal discharge voltage ("$V_d$") for the cell. Additionally, in some of these embodiments, an initial open cell potential ("OCP")/SOC relationship for the cell is stored in the memory. The stored criteria provide values for the algorithm that the processor uses to implement the different additive activation profiles. The criteria stored in the memory are obtained in any desired manner.

The BMS 200 uses the battery model and the diagnostic algorithm to deconvolute the SOCs of the two working electrodes from measurements of the full-cell potential and current (block 304). An example of a system and method that can be modified to calculate the SOC of the working electrodes is found in U.S. application Ser. No. 12/396,918, filed on Mar. 3, 2009, the entire contents of which are incorporated by reference herein. The estimated SOC values are then transformed into a total lithium content in each electrode by the BMS 200 (block 306).

The BMS 200 computes the difference between the present Li content in each electrode and the desired Li content in each electrode that indicates a balance of capacity between the two electrodes (block 308). The BMS 200 compares this difference to the amount of Li contained in one or more additive batches in the respective electrode(s) using data stored in the memory 206 (block 310). If the amount of Li contained in the batches is more than the difference between the present and desired Li content in the electrode(s) at block 312, the process 300 returns to block 304 for continued monitoring of the SOCs of the electrode(s). If the amount of Li contained in one of the batches is close to, for example, within 2% or less of the difference between the present and desired Li content in the electrode(s) at block 312, the process 300 continues to block 314. At block 314, the BMS activates the one or more batches of additive to bring the Li content of the electrodes to the desired level.

In one embodiment, the BMS 200 is located in a single device. In another embodiment, portions of the BMS 200 are located apart from other portions of the BMS 200. In yet other embodiments, functions of the processor are performed by multiple processors. By way of example, the electrodes and Li additives in one embodiment are located within a vehicle battery. A processor carried in the vehicle monitors the SOC of the battery and provides a warning signal to a user when the available Li content of one or more of the electrodes falls below a predetermined threshold. The user then proceeds to a service station where the compromise control equipment is located and used to activate additional Li under control of a processor associated with the compromise control equipment. In some embodiments, communications between the processor within the vehicle and the processor within the compromise control equipment are established using a CAN communication bus or other communication protocol/system.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A battery management system, comprising:
a battery including:
a first electrode;
a second electrode;
a separator region configured to electronically isolate the first and second electrodes;
a first portion of lithium metal encapsulated within a first ionically insulating barrier configured to prevent transport of lithium ions therethrough;
a memory in which command instructions are stored; and
a processor configured to execute the command instructions to (i) determine a first lithium content of the first electrode, (ii) compare the first lithium content of the first electrode to a first threshold, and (iii) activate the first portion of lithium metal by compromising the first ionically insulating barrier based on the comparison of the first lithium content to the first threshold.

2. The battery management system of claim 1, wherein the processor is further configured to execute the command instructions to (i) determine a second lithium content of the second electrode, (ii) compare the first lithium content of the first electrode and the second lithium content of the second electrode, and (iii) activate the first portion of lithium metal based on the comparison of the first lithium content and the second lithium content.

3. The battery management system of claim 2, wherein the processor is further configured to execute the command instructions to activate the first portion of lithium metal when the first lithium content of the first electrode plus the first portion of lithium metal is equal to the second lithium content.

4. The battery management system of claim 1, wherein:
the battery further includes a second portion of lithium metal encapsulated within a second ionically insulating barrier configured to prevent transport of lithium ions therethrough; and
the processor is further configured to executed the command instructions to activate the second portion of lithium metal independently of the first portion of lithium metal based on the comparison of the first lithium content to the first threshold.

5. The battery management system of claim 4, wherein the processor is further configured to execute the command instructions to (i) determine a second lithium content of the second electrode, (ii) compare the first lithium content of the first electrode and the second lithium content of the second electrode, and (iii) activate the second portion of lithium metal based on the comparison of the first lithium content and the second lithium content.

6. The battery management system of claim 1, wherein:
the battery further includes a second portion of lithium metal encapsulated within a second ionically insulating barrier configured to prevent transport of lithium ions therethrough; and
the processor is further configured to execute the command instructions to (i) compare the first lithium content to a second threshold and (ii) activate the second portion of lithium metal based on the comparison of the first lithium content to the second threshold.

7. The battery management system of claim 1, wherein:
the battery further includes a second portion of lithium metal encapsulated within a second ionically insulating barrier configured to prevent transport of lithium ions therethrough; and
the processor is further configured to execute the command instructions to (i) determine a second lithium content of the second electrode, (ii) compare the second lithium content of the second electrode to a second threshold, and (iii) activate the second portion of lithium metal based on the comparison of the second lithium content to the second threshold.

8. The battery management system of claim 7, wherein the processor is further configured to execute the command instructions to (i) compare the first lithium content of the first electrode and the second lithium content of the second electrode, and (ii) activate at least one of the first portion of lithium metal and the second portion of lithium metal based on the comparison of the first lithium content and the second lithium content.

9. The battery management system of claim 8, wherein the processor is further configured to execute the command instructions to activate the first portion of lithium metal and the second portion of lithium metal when the first lithium content of the first electrode plus the first portion of lithium metal plus the second portion of lithium metal is equal to the second lithium content.

10. The battery management system of claim 8, wherein the processor is further configured to execute the command instructions to activate the first portion of lithium metal and the second portion of lithium metal when the first lithium content of the first electrode plus the first portion of lithium metal is equal to the second lithium content of the second electrode plus the second portion of lithium metal.

11. The battery management system of claim 1, wherein the processor is further configured to execute the command instructions to control a compromise control device to activate the first portion of lithium metal by one or more of (i) applying a first breach pressure to the first portion of lithium metal to fracture the first barrier, and (ii) increasing a temperature of the battery to a first breach temperature to fracture the first barrier.

12. The battery management system of claim 1, further comprising:
a compromise control device configured to selectively activate the first portion of lithium metal by one or more of (i) applying a first breach pressure to the first portion of lithium metal to fracture the first ionically insulating barrier, and (ii) increasing a temperature of the battery to a first breach temperature to fracture the first ionically insulating barrier; and
a compromise condition detector suite operably connected to the processor and configured to detect one or more of (i) pressure within the first electrode, and (ii) temperature within the first electrode.

13. The method of claim 1, wherein a compromise condition detector suite is configured to detect one or more of (i) pressure within the first electrode, (ii) temperature within the first electrode, and (iii) potential of the first electrode.

* * * * *